United States Patent [19]

Makino et al.

[11] 4,230,512
[45] Oct. 28, 1980

[54] CENTER BLOCK SIDE RIB TREAD PATTERN FOR HEAVY VEHICLE RADIAL TIRES

[75] Inventors: Shigeo Makino, Tokorozawa; Norboru Sugimura; Shigeta Aoki, both of Higashimurayama, all of Japan

[73] Assignee: Bridgestone Tire Co., Ltd., Tokyo, Japan

[21] Appl. No.: 24,352

[22] Filed: Mar. 27, 1979

[30] Foreign Application Priority Data

Apr. 8, 1978 [JP] Japan .................................. 53/40802

[51] Int. Cl.$^3$ ............................................. B60C 11/06
[52] U.S. Cl. ................................................ 152/209 R
[58] Field of Search ....... 152/209 R, 209 D, 209 WT, 152/209 NT

[56] References Cited

U.S. PATENT DOCUMENTS

| | | | |
|---|---|---|---|
| 3,559,712 | 2/1971 | Verdier | 152/209 R |
| 3,698,462 | 10/1972 | Jacobs | 152/209 R |
| 3,831,654 | 8/1974 | Boileau | 152/209 R |
| 4,122,879 | 10/1978 | Takigawa et al. | 152/209 R |

FOREIGN PATENT DOCUMENTS 2711066  9/1977  Fed. Rep. of Germany ...... 152/209 R
932401  7/1963  United Kingdom ............... 152/209 R

OTHER PUBLICATIONS

German Utility Model NR 1621801, Dec. 3, 1951, translation.

*Primary Examiner*—Michael W. Ball
*Attorney, Agent, or Firm*—Sughrue, Rothwell, Mion, Zinn and Macpeak

[57] ABSTRACT

A pneumatic radial tire for heavy vehicles comprising in combination two wide zigzag circumferential main grooves for dividing a tread into a center region and two side regions, a narrow zigzag groove for dividing each region into two portions, and a branch groove located in the center region and connected to the main and narrow grooves to define blocks and satisfying the following requirements, i.e.

(1) each main groove has a width which is 5 to 9% of the width of the tread, is substantially U-shaped in cross-section and has a wall defined by a bent or wavy line whose pitch is 0.3 to 1.3 times the width of the main groove and a swing width within a range from 0.1 to 1.0 times the width of the main groove, and (2) the branch groove has a depth which is 14 to 36% of the depth of the main groove.

8 Claims, 4 Drawing Figures

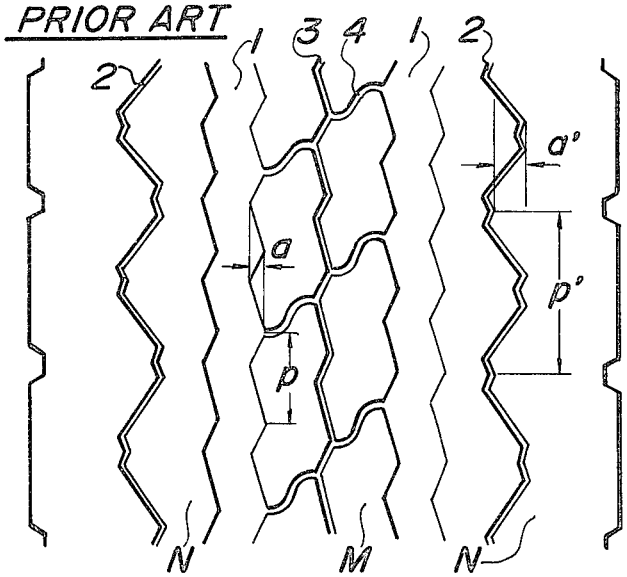
FIG_1 PRIOR ART
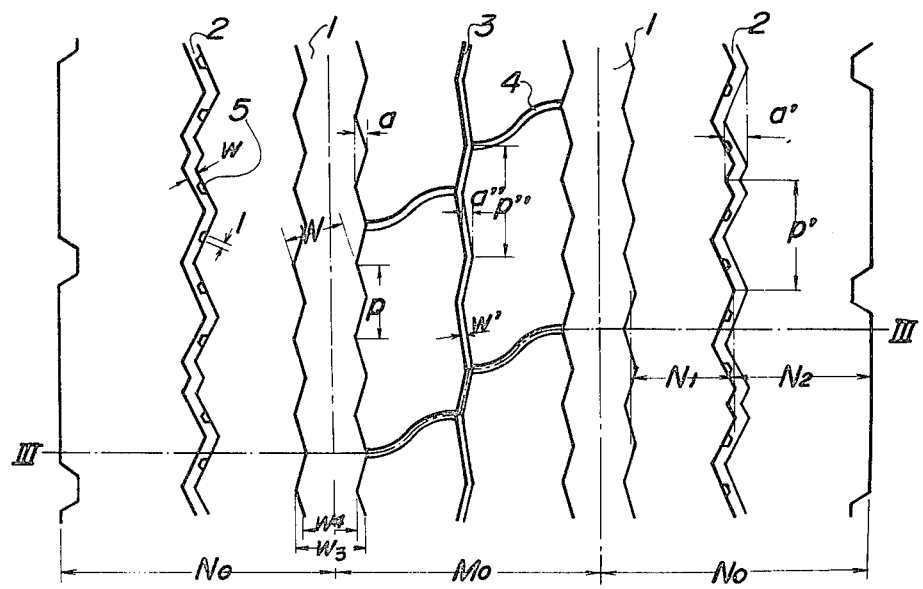
FIG_2

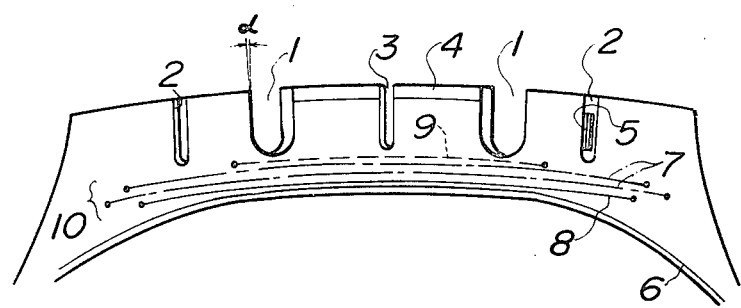
FIG_3
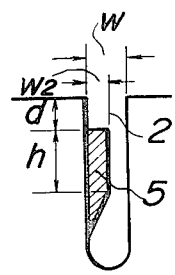
FIG_4

CENTER BLOCK SIDE RIB TREAD PATTERN FOR HEAVY VEHICLE RADIAL TIRES

BACKGROUND OF THE INVENTION

1. Field of the Invention

This invention relates to pneumatic radial tires for heavy vehicles and more particularly to a pneumatic radial tire for heavy vehicles which can efficiently improve its running performance on good roads.

2. Description of the Prior Art

The above mentioned kind of pneumatic radial tire for heavy vehicles such as trucks, buses or the like, which will hereinafter be abbreviated as a truck bus tire, comprises a so-called radial carcass including cords arranged in a radial plane or inclined at a small angle to the radial plane and a belt layer superimposed about the radial carcass and including metal wire cords, particularly steel wire cords. The carcass and belt layer function to reinforce that portion of the tire which is located immediately beneath a tread surface in an extremely rigid manner. As a result, the truck bus tire is far superior in wear resistant property to a conventional bias tire. In addition, the truck bus tire has a number of advantages inclusive of a puncture resistant property and the like. But, the rigid and strong reinforcing effect due to the belt layer results in an uncomfortable ride and makes it difficult to cause the tire to exhibit a tame effect of subordinating it to the road surface. As a result, apart from the use under an off-road condition, the truck bus tire is particularly suitable for use exclusively in running on a good road at a high speed. The truck bus tire for such use has been developed and investigated, while significant improvement in roads such as improved highways has stimulated a great demand for the truck bus tire, thereby eliminating the bias tire from the market.

It is a matter of course that the truck bus tire has been developed and investigated with respect to its internal construction. But, the main development and investigation thereof have been concentrated into improvement in a tread pattern which can cause it to be subordinated to the condition in use of the truck bus tire on a good road at a high speed.

For example, it has heretofore been proposed to provide a rib type tread pattern including a combination of two wide zigzag circumferential grooves located on opposite sides near the equatorial plane of the tire and narrow zigzag grooves substantially parallel to the wide grooves and adapted to be closed at a ground contact region of the tire. Such rib type tread can alleviate so-called uneven wear to be produced in the conventional rib type tread pattern in which the tread is divided into narrower ribs of substantially equal width by means of four wide grooves. But, such rib type tread pattern has the disadvantage that drainage ability of the groove becomes reduced by half and hence the wet resistant property of the tire which is indispensable to the high speed running tire becomes degraded.

The wet resistant property shall be understood to not only mean resistance to the extremely dangerous hydroplane phenomenon which causes the tire to ride on a water film spread on the road surface by a rainfall, for example, and which causes a directional property of the tire to be entirely lost, but also mean resistance to slip and skid which can always renew a biting action of the tire exerted against the water film spread on the road surface both during running and braking of the tire, or the like. Such wet resistant property of the tire can efficiently be improved by shearing the water film spread on the road surface by a step-in side of a tread center region where the tire begins to make contact with the road and by quickly drain water.

As a result, it is rather beneficial to use a lug or block pattern. But, in order to keep a smooth high speed running property, it is more effective to use a block pattern than a lug pattern and more particularly to use a center block-side rib type tread pattern which can favorably maintain the rib's property. In the center block-side rib type tread pattern, that edge of the block which makes contact with the road at first serves to cut the water film and easily drain water through branch grooves for defining the blocks to main groove for separating the blocks from the rib. In addition, the edge of the branch grooves serves to exhibit an efficient road holding ability.

The center block-side rib type tread pattern can easily contract the tread center region in both radial and circumferential directions. As a result, the uneven wear at the shoulder region, that is, shoulder wear produced due to the fact that the crown curvature causes the linear speed on the circumference in the ground contact region of the tire to be smaller toward the tread shoulder can favorably be alleviated by absorbing the difference in the circumferential lengths which induces the uneven wear by the above mentioned contraction in the ground contact region of the tire and by obtaining the smooth ground contact configuration. In addition, it is possible to efficiently alleviate the above mentioned disadvantage inherent to the radial tire that the tire is prevented from becoming subordinated to the road surface and that the tire is uncomfortable in ride.

But, it has been reported that the center block-side rib type tread pattern involves abnormal wear which is different from the above mentioned uneven wear when the tire is used under severe conditions.

Such abnormal wear is inclusive in the first place of a river wear, i.e. a river bank stepped bill-shaped wear which advances from a projection at the edge of the circumferential main groove along the edge, secondly, an irregular wear in which several blocks only become worn in unbalanced state with respect to the other blocks and thirdly a wavy wear selectively produced at the kicking-out side of opposed edges of the side auxiliary groove in the side rib and the like.

Such abnormal wear is also inclusive of heel and toe wear.

SUMMARY OF THE INVENTION

An object of the invention, therefore, is to provide a pneumatic radial tire for heavy vehicles adapted to run on good roads at high speed, which can eliminate the above mentioned abnormal wear of a tread without degrading its wet resistant property.

A feature of the invention is the provision in a pneumatic radial tire for heavy vehicles having a center block-side rib type tread pattern, comprising a reinforcement structure for rigidly reinforcing that portion of the tire which is located directly beneath a tread by means of a carcass including cords arranged substantially in a radial plane and a belt layer including metal wire cords and superimposed about the carcass. Two relatively wide main grooves extend in circumferential direction of the tire and are spaced apart from each other in the widthwise direction of the tire by a distance which is within a range between at least 20% of the tread width and at most 60% of the effective width of the belt layer. The two main grooves divide the tread into a center region and two side regions. A relatively narrow zigzag or substantially zigzag auxiliary groove extends in circumferential direction of the tire and divides each of the three regions into two portions. A branch groove is located in the center region of the tread and connects the zigzag center auxiliary groove to the right and left main grooves alternately, the center branch groove dividing the center region of the tread also in the circumferential direction. Specifically, of the improvement wherein said main grooves have a width which is 5 to 9% of the width of the tread and are substantially U-shaped in cross-section and in which at least those edges of said main grooves which define said center region consists of a bent or wavy line having an allocated pitch of 0.3 to 1.3 times the width of said main groove and a swing width within a range from 0.1 t 1.0 times the width of said main groove. The main grooves form substantially a direct through drainage path, and in which said branch groove has a depth which is far shallower than and corresponds to 14 to 36% of the depth of said main groove. The branch groove together with the main and center auxiliary grooves define the blocks in the center region of the tread.

Further objects and features of the invention will be fully understood from the following detailed description with reference to the accompanying drawings, in which:

BRIEF DESCRIPTION OF THE DRAWINGS

FIG. 1 is a plan view of a portion of a tire tread of a conventional center block-side rib type truck bus tire;

FIG. 2 is a plan view similar to that of FIG. 1 and showing a center block-side rib type truck bus tire according to the invention;

FIG. 3 is a cross-section taken along the line III—III in FIG. 2; and

FIG. 4 is an enlarged cross-sectional view of the platform shown in FIGS. 2 and 3.

DETAILED DESCRIPTION OF THE PREFERRED EMBODIMENT

FIG. 1 shows a portion of a tire tread of a conventional center block-side rib type truck bus tire. Referring to FIG. 1, reference numeral 1 designates two relatively wide main grooves extending around the circumference of the tread and dividing the tread into three regions, i.e. a center region M and two side regions N, N, and 2 a relatively narrow side auxiliary groove extending around the circumference of the tread and dividing each side region into two ribs.

The main grooves 1, 1 shown in FIG. 1 have a spacing between the centers thereof of 62.1 mm, a width of 13.9 to 15.9 mm, a depth of 14.7 mm, a swing width a of 5 mm and a pitch p of 25 to 31 mm. A zigzag center auxiliary groove 3 and branch grooves 4 in the center block have a width of 2.1 mm and 1.7 to 1.8 mm, and a depth of 14.7 mm and 12.9 mm, respectively. The side auxiliary groove 2 in the side rib has a width of 3.0 to 3.5 mm, a depth of 14.7 mm, a swing width a' of 14.0 mm, and a pitch p' of 50.6 to 61.8 mm.

The use of the conventional truck bus tire shown in FIG. 1 ensures significant improvement in wet performance as well as driving and braking performances, but provides the disadvantage that the tire is subjected to the above mentioned abnormal wear.

Experimental tests have demonstrated that as soon as there is every indication that the above mentioned wear occurs, such wear becomes accelerated by the continued use of the tire. As a result, it is ascertained that it is quite important to cause the tire to be subordinated to the road in the beginning of the use. In addition, experimental tests have yielded the surprising result that the initial construction and arrangement of the center blocks can eliminate every indication of all abnormal wear inclusive of the above mentioned irregular wear and hence can efficiently prevent occurrence and growth of the abnormal wear, thereby contributing to the long life of the tire. That is, it is found out that the construction and arrangement of the center blocks can exhibit the effect of subordinating the tire to the road surface and that the basic cause developing to various kinds of abnormal wears under severe condition of the tire in use can be absorbed and eliminated in the initial wear stage of the tire.

The present invention is based on such recognition and provides a pneumatic radial tire for heavy vehicles adapted to run on good roads at high speed in which the above mentioned effect of subordinating the tire to road surface is introduced into tire design for the purpose of eliminating the abnormal wear of the tread without degrading the wet resistant property thereof.

In the present invention, in order to maintain or rather improve the wet resistant property of the tire, provision is made for a drainage path which is substantially a direct through path, which extends in circumferential direction of the tire and which can significantly decrease resistance to the drainage for the water film produced directly beneath the ground contact region of the tire.

In the present invention, the depth of the branch groove for dividing the center region into blocks is made far shallower than that of the main groove. The use of such a measure provides the important advantage that it is possible to prevent every indication of the irregular wear of the blocks, and that, in the initial wear stage until the branch grooves become disappeared, it is possible to prevent the basic course, which has heretofore been grown into the abnormal wear, from occurring. The disappearance of the branch grooves due to the initial wear causes a center rib to be exposed. It is found, however, that all of the latent causes for the abnormal wear are eliminated and that the use of the specially designed drainage path can sufficiently maintain the wet resistant property of the tire even after the disappearance of the branch grooves.

In the invention, it is found that the wavy wear produced along the edge of the side auxiliary grooves for dividing the side rib into side and shoulder ribs is dependent on the swing width of the edge of the side auxiliary groove. In order to efficiently eliminate such wavy wear by the above mentioned effect of subordinating the tire to the road surface, it is necessary to reduce the zigzag swing width of the edge of the side auxiliary groove without degrading its wet resistant property. Experimental tests have shown the result that if the zigzag pitch and swing width of the edge of the side auxiliary groove are made at most 2.0 to 2.5 times and 1.8 to 4.0 times the allocated pitch and swing width of the main groove, respectively, it is possible to effectively prevent the wavy wear while exhibiting the efficient contributory action of the side auxiliary groove of maintaining the driving and braking performance as well as the wet resistant property thereof. In order to sufficiently exhibit these properties, the surface opening of the side auxiliary groove at the ground contact region must be maintained. As a result, the above mentioned side auxiliary groove for defining the side rib and shoulder rib must be provided at its wall with a platform which serves as a spacer for maintaining the surface opening of the side auxiliary groove. At least one of these platforms may be located at a position which lies within 25% of the length of the ground contact region.

As described above, in the truck bus tire according to the invention, that portion of the tire which lies directly beneath the tread is reinforced by the radial carcass and belt layer including metal wire cords and preferably steel wire cords for the purpose of satisfying the requirements of tire performance. In addition, the centers of the two main grooves for defining the block and rib of the center block-side rib type tread pattern are spaced apart by a distance which is 20% of the tread width to 60% of the effective width of the belt layer. If the spacing between the centers of the two main grooves is narrower than 20% of the tread width, the block arrangement in the center region does not exhibit an eminent contribution of alleviating the shoulder wear. On the contrary, if the spacing between the centers of the two main grooves is wider than 60% of the effective width of the belt layer, the rib width becomes too narrow to prevent the shoulder wear from becoming accelerated to such an extent that the shoulder wear could not be alleviated by the feature of the invention.

The effective width of the belt layer shall be understood to mean a width of an overlapped region of those main cord layers which exclude extremely narrow cord layers but include cords inclined at an angle of 10° to 33° with respect to the equatorial line of the tire in reverse directions.

In the present invention, the main groove has a width which is 5 to 9% of the width of the tread and is U-shaped in cross-section. The lower limit is defined for the purpose of ensuring the desired wet resistant property while maintaining a sufficiently high drainage ability and the upper limit is defined for the purpose of obtaining a required surface area of the tread. The main groove is made substantially U-shaped in cross-section owing to the reasons that the use of the U-shaped main groove ensures a sufficient drainage ability thereof irrespective of unavoidable uniform wear of the tread and provides the important advantage that the difference in rigidity along the edge of the main groove becomes small, thereby effectively eliminating river wear.

Substantially U-shaped in cross-section means that the invention covers not only one case in which the opposed groove walls are parallel to the cross-section taken on the equatorial plane of the tire, but also the other case in which the opposed groove walls are inclined at an angle $\alpha$ (FIG. 3) of 4° to 8° with respect to a normal line drawn perpendicular to the tread surface.

In addition, the edge of the main groove is made bent or wavy such that an allotted pitch is 0.3 to 1.3 times the width of the main groove and that a swing width is 0.1 to 1.0 times the width of the main groove. In other words, the edge of the main groove resembles a toothed edge of a saw whose pitch and swing widths are far narrower than those of the zigzag formation used for the conventional tread pattern. The use of such edge formation provides a straight through drainage path having a considerably wide width about the center of the main groove and extending in the circumferential direction, thereby ensuring the drainage ability and alleviating the river wear.

If the allotted pitch is narrower than 0.3 times the width of the main groove and if the swing width is narrower than 0.1 times the width of the main groove, it is impossible to expect the edge effect of the edge of the main groove which takes part in the driving and braking performances of the tire. On the contrary, if the allotted pitch is wider than 1.3 times the width of the main groove and if the swing width is wider than 1.0 times the width of the main groove, projections present in the drainage path prevent directions of the drainage path, thereby deteriorating the wet resistant property of the tire.

In addition, in the present invention, the branch grooves for defining blocks have a depth of 14% to 36%, preferably on the order of 20% of the depth of the main groove for the purpose of efficiently exhibiting the above-mentioned effect. If the depth is shallower than the lower limit of 14% of the depth of the main groove, the center blocks function as substantially rib rather than block, so that it becomes impossible to alleviate the shoulder wear by the side rib. On the contrary, if the depth becomes deep and exceeds the upper limit of 36% of the depth of the main groove, there is produced the irregular wear as described with reference to the conventional tire shown in FIG. 1, so that the effect aimed at the present invention cannot be attained. It is particularly preferable that the branch groove of a truck bus tire having 10.00R20 size which has most commonly been used in practice has a depth of 3 to 4 mm.

As stated hereinbefore, the truck bus tire according to the invention can alleviate various kinds of abnormal wear without the wet resistant deteriorating property of the tire.

The technical contents of the invention will now be described in greater detail with reference to FIGS. 2, 3 and 4.

FIG. 2 shows a tire tread of a truck bus tire according to the invention, FIG. 3 shows its section and FIG. 4 shows an auxiliary groove in the side region in an enlarged scale.

Referring to FIGS. 2, 3 and 4, reference numeral 1 designates a circumferential main groove for dividing a tread of a truck bus tire according to the invention into three regions in widthwise direction, 2 a zigzag side auxiliary groove for dividing each side region $N_0$, which has been separated from a center region $M_0$ by the circumferential main groove 1, 3 a zigzag center auxiliary groove for dividing the center region $M_0$ into two portions, 4 a branch groove which is communicated with the zigzag groove 3 and main groove 1 to divide the center region $M_0$ into a number of blocks and 5 a platform projected from the wall of the zigzag side auxiliary groove 2 in each side region $N_0$. As shown in FIG. 3, the truck bus tire according to the invention comprises a reinforced construction in which that portion of the tire which lies directly beneath a tread is rigidly reinforced by a carcass 6 and a belt layer 10. In the present embodiment, the carcass 6 is composed of one ply including steel cords inclined at an angle of 0° with respect to the radial plane of the tire and the belt layer 10 is composed of a main layer 7 including cords inclined at an angle of 20° with respect to the circumferential direction of the tire and crossed in reverse directions, a cushioning layer 8 including cords inclined at an angle of 67° with respect to the circumferential direction of the tire and interposed between the main layer 7 and the carcass 6 and a narrow width layer 9 extending between the two circumferential main grooves 1, 1 and superimposed about the main layer 7.

Various dimensions of the truck bus tire according to the invention and mounted on a rim and inflated by applying a normal internal pressure are as follows.

| Tire size: 10.00R20 14PR | |
|---|---|
| Tread width | 198 mm |
| Effective tread width | 165 mm |
| Circumferential main groove | |
| Swing width a | 2.5 mm |
| Pitch length p | 16.3 to 18.1 mm |
| Groove width w | 15.5 to 16.3 mm |
| Spacing between main grooves $M_0$ | 32.7% of tread width |
| Groove depth | 14.7 mm |
| Cross-sectional configuration of groove | U-shape Inclined angle $\alpha$ of groove wall : 4 to 8° |
| Zigzag center auxiliary groove 3 in center region | |
| Swing width a" | 2.6 mm |
| Pitch length p" | 24.5 to 27.1 mm |
| Groove width w' | 1.8 to 2.0 mm |
| Groove depth | 14.7 mm |
| Branch groove 4 | |
| Groove width | 1.6 mm |
| Groove depth | 3.0 mm |
| Platform 5 | |
| The zigzag side auxiliary grooves 2, 2 in both the side regions $N_0$ are provided with a following platform 5. The zigzag side auxiliary grooves 2, 2 are provided at each rectilinear section thereof with one platform 5. | |
| Projection width $w_2$ | 1.5 mm |
| Depth from tread to platform d | 5 mm |
| Height h | 5 mm |
| Length l | 4 mm. |
| Length of ground contact region under load: | 260 mm |

Provision is made of a comparative tire which is basically composed of the conventional tire shown in FIG. 1 and substantially different from the tire according to the invention described above that the zigzag side auxiliary groove 2 in the side region N has a swing width a' of 10.4 mm and a pitch length p' of 51.6 mm, that the zigzag side auxiliary groove 2 is not provided with the platform 5 and that the branch groove 4 has a depth which is the same as that of the main groove 1, the other features inclusive of the tire tread reinforcement construction being the same as those of the tire according to the invention.

Both the tire according to the invention and the comparative tire described above were inflated by applying a normal internal pressure of 7.25 kg/cm$^2$ and tested under 100% load, i.e. under load of 2.425 kg per one tire on a highway road over a distance of over 20,000 km and measured the wavy wear and irregular block wear. The experimental tests have demonstrated that the tire according to the invention shows no indication of the above mentioned abnormal wear and that the comparative tire shows a trace which will be developed into the irregular block wear and wavy wear in future.

As can be seen from the above, in the present invention, the main groove is made wide in width within a range from 5 to 9% of the tread width, U-shaped in section and serrated along the edge whose undulation is less than that of the conventional zigzag main grooves. The use of these measures ensures a straight through drainage path which can efficiently avoid deterioration of the wet resistant property of the center block-side rib type tread pattern due mainly to decrease of the drainage ability. In addition, the serrated groove edge having short allotted pitch and narrow swing width and small difference in rigidity along the circumferential edge render it possible to effectively prevent the so-called river wear.

The center region blocks in the ground contact region function to be contracted in both circumferential and radial directions to efficiently compensate in both the side regions of the tread the difference between circumferential length thereof, thereby preventing the so-called shoulder wear which tends to be occurred at the side rib and shoulder rib.

Particularly, the feature of the invention that the branch groove 4 has a depth of 14 to 36%, preferably 20% of that of the main groove 1 is capable of effectively avoiding the irregular wear of the blocks which has been encountered with the case when the branch groove 4 has a depth which is deeper than 36% of the main groove 1. In addition, the branch groove 4 exhibits the effect which can eliminate the latent indication of various kinds of abnormal wear inclusive of the irregular block wear during the initial wear stage until the branch-groove 4 becomes disappeared.

As above mentioned, the depth of the branch groove 4 is defined on the basis of the depth of the main groove 1 which is 14.7 mm in the present embodiment.

The zigzag center auxiliary groove 3 for dividing the blocks in the center region into two rows of blocks has a width of 0.5 to 2.5% of the tread width which is the same as the width of the branch groove 4. Under such width, both the center auxiliary groove 3 and the branch groove 4 are required to keep at least surface opening thereof open when the tire makes contact with the road so as to easily drain. The presence of such open grooves ensures a continuous ventilation during rotation of the tire, thereby cooling the tire and hence preventing accumulation of heat therein.

The center auxiliary groove 3 has a depth which is the same as that of the main groove 1 and a swing width a" which is substantially the same as that of the main groove 1.

The zigzag side auxiliary grooves 2, 2 each dividing the side region $N_0$ of the tread into the side rib and shoulder rib are spaced apart from each other by a distance which is shorter than the effective width of the belt layer 10, preferably 90% the effective width of the belt layer 10, the distance being measured between center lines of these side auxiliary grooves 2, 2.

Each zigzag side auxiliary groove 2 has a width which is 0.5 to 2.5% of the tread width and is substantially U-shaped in section having a zigzag pitch p' and swing width a' which are far larger than those of the serrated edge of the main groove 1. Each zigzag side auxiliary groove 2 is provided at least one of opposed edges thereof with a platform 5 projected toward the other edge. At least one platform 5 is located within 25% of the length of the ground contact region of the tire. Alternatively, one of the opposed groove walls of each zigzag side auxiliary groove 2, which is located at the shoulder rib side, may be inclined at an angle which is preferably on the order of 6° with respect to a normal line drawn perpendicular to the tread surface, while the other groove wall may be made parallel to the normal line. Such a sectional configuration of the zigzag side auxiliary groove 2 makes it possible to improve the rigidity of the shoulder rib so as to prevent the uneven wear at the shoulder region and at the same time to prevent the zigzag side auxiliary groove 2 from clogging with stones.

The above mentioned width of the side auxiliary groove 2 can keep it open at the ground contact region of the tire which with the aid of the platform 5 ensures a drainage ability at the side region $N_0$ of the tread, thereby preventing the wet resistant property from deteriorating.

The above mentioned spacing between the zigzag side auxiliary grooves 2, 2 is determined by taking the ground contact ratio between the shoulder rib and the side rib into consideration to avoid shoulder wear and wavy wear. It has been well known that the above mentioned ground contact ratio between the shoulder rib and side rib is 1:1.2 to 1:1.8.

The zigzag formation of the zigzag side auxiliary groove 2 is determined such that the allotted pitch p' thereof is 2.0 to 2.5 times that of the main groove 1 and that the swing width a' thereof is 1.8 to 4 times that of the main groove 1. Such zigzag formation of the zigzag side auxiliary groove 2 makes it possible to prevent wavy wear from occurring at the shoulder rib.

In the zigzag formation of the side auxiliary groove 2, an increase of the swing width a' contributes to an increase of both the driving and braking performances at the shoulder and side ribs of the tire, but results in an increase of wavy wear. In order to effectively decrease the swing width without reducing the total sum of the length of the edge of the auxiliary side groove 2 relating to the above mentioned performances, it is preferable to make locally invert a top region of the zigzag formation as shown in FIG. 2.

In the present invention, the side auxiliary groove 2 is provided at its rectilinear edge with the platform 5 which is projected from the edge and functions to keep the side auxiliary groove 2 open and hence ensure the wet resistant property of the tire, thereby eliminating wavy wear. In order to improve the wet resistant property, it is preferable to locate the top surface of the platform 5 at a portion which is lower than the tread surface by a distance d (FIG. 4). The platform 5 has a depth h not reaching the groove base, thereby providing a drainage path extending through the side auxiliary groove 2. The platform 5 has a length which is equal to and longer than the width of the side auxiliary groove 2 for the purpose of rendering it to act as a spacer for keeping the side auxiliary groove 2 open.

The center auxiliary groove 3 may also be provided with the above mentioned platform 5.

As stated hereinbefore, the invention is capable of improving the overall performance of a truck bus tire by means of a peculiar block pattern which exhibits an effect of preventing an indication loading to growth and development in future of abnormal wear inclusive of shoulder wear and uneven block wear without degrading the drainage ability which directly exerts influence upon both the driving and braking performances of the tire and particularly the wet resistant property represented by the slip and skid resistant property on wet roads and hydroplaning resistant property or the like when a radial tire having a center block-side rib type tread pattern is brought into a specially high speed running condition under a heavy load. In addition, the side auxiliary groove functions to eliminate under the control of the above mentioned effect the wavy wear liable to occur in the shoulder rib and hence effectively utilize the truck bus tire for its total life.

What is claimed is:

1. In a pneumatic radial tire for heavy vehicles having a center block-side rib type tread pattern, comprising a reinforcement structure for rigidly reinforcing that portion of the tire which is located directly beneath a tread by means of a carcass including cords arranged substantially in a radial plane and a belt layer including metal wire cords and superimposed about the carcass, two relatively wide main grooves extending in circumferential direction of the tire and spaced apart from each other in the widthwise direction of the tire by a distance which is within a range between at least 20% of the tread width and at most 60% of the effective width of the belt layer, these two main grooves dividing the tread into a center region and two side regions, a relatively narrow zigzag or substantially zigzag auxiliary groove extending in circumferential direction of the tire and dividing each of the three regions into two portions and a branch groove located in the center region of the tread and connecting the zigzag auxiliary groove to the right and left main grooves alternately, the branch groove dividing the center region tread also in the circumferential direction, of the improvement wherein each of said main grooves has a width which is 5 to 9% of the width of the tread and is substantially U-shaped in cross-section and in which at least those edges of said main grooves which define said center region consist of a bent or wavy line having an allocated pitch of 0.3 to 1.3 times the width of said main grooves and a swing width within a range from 0.1 to 1.0 times the width of said main groove, said main grooves forming substantially a direct through drainage path, and in which said branch groove has a depth which is far shallower than and corresponds to 14 to 36% of the depth of said main groove, said branch grooves together with said main and auxiliary grooves defining the blocks in the center region of the tread.

2. The pneumatic radial tire according to claim 1, wherein said zigzag auxiliary grooves located at said two side regions have a width which is 0.5 to 2.5% of the width of the tread and are substantially U-shaped in cross-section and have a zigzag pitch and swing width which are far larger than those of those edges of said main grooves which define said center region, at least one of opposed edges of said zigzag auxiliary grooves being provided with at least one platform extending partially from the side wall of the groove across the groove channel and located within a space which is at 25% of the space of the ground contact region of the tire.

3. The pneumatic radial tire according to claim 2, wherein each of said zigzag auxiliary grooves located at said two side regions is provided at its rectilinear edge with a platform.

4. The pneumatic radial tire according to claim 2, wherein said platform has a length which is at least equal to the width of said zigzag auxiliary grooves located at said two side regions and is located at a position which is separated from the base of said zigzag auxiliary groove.

5. The pneumatic tire according to claim 2, wherein said platform is provided with a shelf-shaped surface lower down from the tread surface.

6. The pneumatic radial tire according to claim 1, wherein said zigzag auxiliary grooves located at said two side regions are spaced apart from each other by a distance of at most effective width of said belt layer.

7. The pneumatic tire according to claim 1, wherein each of said zigzag auxiliary grooves located at said two side regions has a cross-sectional configuration wherein one of the opposed groove walls thereof, which is located at the shoulder rib side, is inclined at an angle which is preferably on the order of 6° with respect to a normal line drawn perpendicular to the tread surface, while the other groove wall is parallel to the normal line.

8. The pneumatic radial tire according to claim 1 wherein said zigzag auxiliary grooves located at two side regions are spaced apart from each other by at most 90% of the effective width of the tire.

* * * * *